(12) United States Patent
Stuntebeck

(10) Patent No.: US 12,095,747 B2
(45) Date of Patent: *Sep. 17, 2024

(54) CRYPTOGRAPHIC PROXY SERVICE

(71) Applicant: AIRWATCH LLC, Atlanta, GA (US)

(72) Inventor: Erich Stuntebeck, Johns Creek, GA (US)

(73) Assignee: Omnissa, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,336

(22) Filed: Jun. 24, 2021

(65) Prior Publication Data

US 2021/0320906 A1    Oct. 14, 2021

Related U.S. Application Data

(60) Continuation of application No. 16/595,818, filed on Oct. 8, 2019, now Pat. No. 11,075,893, which is a
(Continued)

(51) Int. Cl.
| | | |
|---|---|---|
| *H04L 9/40* | (2022.01) | |
| *H04L 9/14* | (2006.01) | |
| *H04L 9/30* | (2006.01) | |
| *H04L 9/32* | (2006.01) | |
| *G06F 21/62* | (2013.01) | |

(Continued)

(52) U.S. Cl.
CPC ............ *H04L 63/0464* (2013.01); *H04L 9/14* (2013.01); *H04L 9/30* (2013.01); *H04L 9/3263* (2013.01); *H04L 63/0281* (2013.01); *H04L 63/0823* (2013.01); *H04L 63/1408* (2013.01); *G06F 21/6245* (2013.01); *H04L 63/0428* (2013.01); *H04L 63/0471* (2013.01); *H04L 67/01* (2022.05); *H04W 4/80* (2018.02); *H04W 12/02* (2013.01); *H04W 12/033* (2021.01)

(58) Field of Classification Search
None
See application file for complete search history.

(56) References Cited

U.S. PATENT DOCUMENTS 5,548,646 A * 8/1996 Aziz .................... H04L 12/4625
382/124
5,659,617 A * 8/1997 Fischer ................. H04L 9/3297
380/258
(Continued)

FOREIGN PATENT DOCUMENTS

CN          104394528 B  *  3/2018  ............ H04W 12/04

OTHER PUBLICATIONS

Google Translation of CN104394528 (Year: 2012).*
(Continued)

*Primary Examiner* — Luu T Pham
*Assistant Examiner* — James J Wilcox
(74) *Attorney, Agent, or Firm* — Kim & Stewart LLP

(57) ABSTRACT

A cryptographic proxy service may be provided. Upon determining that data associated with a network destination comprises at least some sensitive data, a cryptographic service may provide a security certificate associated with the network destination. The plurality of data may be encrypted according to the security certificate associated with the network destination and provided to the cryptographic service for re-encryption and transmission to the network destination.

15 Claims, 5 Drawing Sheets

Related U.S. Application Data continuation of application No. 15/439,349, filed on Feb. 22, 2017, now Pat. No. 10,469,465, which is a division of application No. 14/311,385, filed on Jun. 23, 2014, now Pat. No. 9,584,492.

(51) Int. Cl.
   H04L 67/01 (2022.01)
   H04W 4/80 (2018.01)
   H04W 12/02 (2009.01)
   H04W 12/033 (2021.01)

(56) References Cited

U.S. PATENT DOCUMENTS

| | | | |
|---|---|---|---|
| 5,799,002 A * | 8/1998 | Krishnan | H04L 47/11 370/234 |
| 5,966,441 A * | 10/1999 | Calamera | H04L 63/0428 715/234 |
| 6,035,398 A | 3/2000 | Bjorn | |
| 6,122,743 A * | 9/2000 | Shaffer | H04L 45/24 726/3 |
| 6,233,577 B1 | 5/2001 | Ramasubramani | |
| 6,249,867 B1 * | 6/2001 | Patel | H04L 9/3271 380/278 |
| 6,289,454 B1 * | 9/2001 | Eslinger | G06F 21/72 713/189 |
| 6,374,355 B1 * | 4/2002 | Patel | H04L 63/1466 713/168 |
| 6,377,993 B1 * | 4/2002 | Brandt | H04L 65/401 709/227 |
| 6,434,628 B1 * | 8/2002 | Bowman-Amuah | H04L 67/568 714/48 |
| 6,516,316 B1 | 2/2003 | Ramasubramani | |
| 6,546,486 B1 * | 4/2003 | Perlman | H04L 63/0209 713/153 |
| 6,550,057 B1 * | 4/2003 | Bowman-Amuah | H04L 67/01 707/999.005 |
| 6,560,705 B1 * | 5/2003 | Perlman | H04L 63/1408 713/153 |
| 6,601,192 B1 * | 7/2003 | Bowman-Amuah | H04L 9/40 714/38.12 |
| 6,636,838 B1 * | 10/2003 | Perlman | H04L 63/0245 709/229 |
| 6,671,818 B1 * | 12/2003 | Mikurak | H04L 63/08 714/48 |
| 6,694,431 B1 * | 2/2004 | Binding | H04L 63/061 713/168 |
| 6,704,866 B1 * | 3/2004 | Benayoun | H04L 63/0428 713/153 |
| 6,714,979 B1 * | 3/2004 | Brandt | H04M 15/44 709/227 |
| 6,772,331 B1 * | 8/2004 | Hind | G06F 21/445 707/999.009 |
| 6,775,772 B1 * | 8/2004 | Binding | H04L 63/0428 380/279 |
| 6,886,095 B1 * | 4/2005 | Hind | H04W 12/50 713/168 |
| 6,904,529 B1 * | 6/2005 | Swander | H04L 63/06 713/151 |
| 6,912,656 B1 * | 6/2005 | Perlman | H04L 45/16 713/170 |
| 6,918,039 B1 * | 7/2005 | Hind | G06F 21/6218 713/176 |
| 6,931,528 B1 * | 8/2005 | Immonen | H04L 9/3271 726/19 |
| 7,039,802 B1 * | 5/2006 | Eskicioglu | H04L 63/0823 713/168 |
| 7,058,600 B1 * | 6/2006 | Combar | H04L 43/06 379/114.03 |
| 7,073,073 B1 * | 7/2006 | Nonaka | G06Q 20/3829 380/278 |
| 7,096,363 B2 * | 8/2006 | Kon | H04L 9/3273 713/176 |
| 7,113,601 B2 * | 9/2006 | Ananda | H04L 9/30 380/255 |
| 7,242,766 B1 * | 7/2007 | Lyle | H04L 9/3271 380/2 |
| 7,386,722 B2 * | 6/2008 | Umezawa | H04L 9/3273 713/168 |
| 7,392,378 B1 * | 6/2008 | Elliott | H04L 9/0852 380/278 |
| 7,441,267 B1 * | 10/2008 | Elliott | H04L 63/0428 713/153 |
| 7,526,560 B1 * | 4/2009 | Samar | H04L 69/14 709/227 |
| 7,543,146 B1 | 6/2009 | Karandikar | |
| 7,739,494 B1 | 6/2010 | Mccorkendale | |
| 7,761,465 B1 * | 7/2010 | Nonaka | H04L 9/083 713/161 |
| 7,770,204 B2 | 8/2010 | Pathakis | |
| 7,870,614 B1 * | 1/2011 | Duhaime | G06F 21/602 713/192 |
| 7,877,600 B2 | 1/2011 | Qiu | |
| 7,995,593 B2 * | 8/2011 | Vasseur | H04L 45/50 709/239 |
| 8,117,464 B1 * | 2/2012 | Kogelnik | H04L 67/1097 713/180 |
| 8,181,260 B2 * | 5/2012 | Friedman | H04L 63/126 709/200 |
| 8,219,816 B2 * | 7/2012 | Statham | H04M 3/51 713/172 |
| 8,306,920 B1 * | 11/2012 | Lynch | G06Q 30/0251 705/64 |
| 8,316,237 B1 * | 11/2012 | Felsher | H04L 63/061 380/282 |
| 8,416,954 B1 * | 4/2013 | Raizen | G06F 16/13 726/2 |
| 8,447,983 B1 * | 5/2013 | Beck | H04L 9/0894 713/172 |
| 8,522,050 B1 * | 8/2013 | Wakerley | H04L 63/0428 713/193 |
| 8,539,592 B2 * | 9/2013 | Kishore | H04N 21/63345 705/51 |
| 8,549,300 B1 * | 10/2013 | Kumar | H04L 9/3263 713/168 |
| 8,583,913 B1 * | 11/2013 | Gabrielson | H04L 63/126 713/168 |
| 8,613,070 B1 * | 12/2013 | Borzycki | H04L 67/104 726/8 |
| 8,615,795 B2 | 12/2013 | Cottrell | |
| 8,677,466 B1 * | 3/2014 | Chuang | H04L 9/3263 726/4 |
| 8,745,372 B2 * | 6/2014 | Orsini | H04L 12/4641 713/168 |
| 8,745,375 B2 * | 6/2014 | Clement | H04L 63/0823 713/156 |
| 8,751,788 B2 * | 6/2014 | Leach | G06F 21/6254 713/193 |
| 8,843,997 B1 * | 9/2014 | Hare | H04L 63/0815 709/200 |
| 8,850,597 B1 * | 9/2014 | Gates | G06Q 10/103 726/26 |
| 8,856,869 B1 | 10/2014 | Brinskelle | |
| 8,862,869 B1 * | 10/2014 | Soon | H04L 63/0428 713/153 |
| 8,887,289 B1 | 11/2014 | Hullale | |
| 8,910,279 B2 * | 12/2014 | Yanovsky | H04L 63/1416 726/22 |
| 8,924,711 B2 * | 12/2014 | Morecki | H04L 63/0428 713/155 |
| 8,954,732 B1 | 2/2015 | Watsen | |
| 9,009,804 B2 * | 4/2015 | Abrams | H04L 63/08 726/4 |
| 9,055,071 B1 * | 6/2015 | Gates | H04L 63/1408 |
| 9,122,880 B2 * | 9/2015 | Arya | G06F 21/6245 |
| 9,152,820 B1 * | 10/2015 | Pauley, Jr. | H04L 63/10 |
| 9,154,479 B1 * | 10/2015 | Sethi | H04L 63/20 |

(56) References Cited

U.S. PATENT DOCUMENTS

| | | | |
|---|---|---|---|
| 9,203,623 B1* | 12/2015 | Lin | H04L 9/32 |
| 9,215,197 B2 | 12/2015 | Basavapatna | |
| 9,219,604 B2* | 12/2015 | Resch | H04L 9/0841 |
| 9,223,995 B1* | 12/2015 | Lavinio | H04L 63/0428 |
| 9,264,224 B2* | 2/2016 | O'Hare | H04L 9/0861 |
| 9,282,098 B1* | 3/2016 | Hitchcock | H04L 63/0281 |
| 9,313,085 B2 | 4/2016 | Pandya | |
| 9,336,359 B2 | 5/2016 | Jain | |
| 9,419,841 B1* | 8/2016 | Kozolchyk | H04L 9/3239 |
| 9,424,439 B2* | 8/2016 | Tamayo-Rios | G06F 21/6245 |
| 9,425,966 B1* | 8/2016 | Potlapally | H04L 63/0823 |
| 9,461,820 B1* | 10/2016 | Dall | H04L 63/061 |
| 9,461,971 B1* | 10/2016 | Wise | H04W 12/037 |
| 9,519,802 B2* | 12/2016 | Dutta | G06F 21/602 |
| 9,571,465 B1 | 2/2017 | Mehr | |
| 9,589,152 B2* | 3/2017 | Sheets | G06F 21/64 |
| 9,609,003 B1* | 3/2017 | Chmielewski | H04L 67/025 |
| 9,660,998 B1 | 5/2017 | Sethi | |
| 9,680,801 B1* | 6/2017 | Martini | H04L 67/141 |
| 9,773,117 B2* | 9/2017 | Plastina | G06F 16/2291 |
| 9,824,353 B2 | 11/2017 | Li | |
| 9,917,817 B1* | 3/2018 | Lad | H04L 63/105 |
| 9,961,066 B1* | 5/2018 | Kitchen | H04L 63/0807 |
| 10,079,839 B1* | 9/2018 | Bryan | G05B 15/02 |
| 10,114,960 B1* | 10/2018 | McClintock | H04L 63/1408 |
| 10,171,483 B1* | 1/2019 | Banerjee | H04L 63/1416 |
| 10,255,445 B1* | 4/2019 | Brinskelle | G06F 21/606 |
| 10,382,452 B1* | 8/2019 | Dawes | H04L 63/02 |
| 10,469,465 B2* | 11/2019 | Stuntebeck | H04L 63/0464 |
| 10,509,799 B2* | 12/2019 | Woodings | G06Q 10/063112 |
| 10,509,914 B1* | 12/2019 | Desai | G06F 21/604 |
| 10,771,243 B1* | 9/2020 | Pasquali | H04L 67/55 |
| 2001/0032310 A1* | 10/2001 | Corella | H04L 9/3239 |
| | | | 713/156 |
| 2002/0038420 A1* | 3/2002 | Collins | H04L 9/3249 |
| | | | 713/156 |
| 2002/0065896 A1* | 5/2002 | Burakoff | G06Q 40/06 |
| | | | 709/206 |
| 2002/0075844 A1* | 6/2002 | Hagen | H04L 63/0442 |
| | | | 370/328 |
| 2002/0078347 A1* | 6/2002 | Hericourt | H04L 9/321 |
| | | | 713/156 |
| 2002/0091782 A1* | 7/2002 | Benninghoff, III | G06Q 20/401 |
| | | | 709/206 |
| 2002/0093915 A1* | 7/2002 | Larson | H04L 41/40 |
| | | | 370/252 |
| 2002/0112167 A1* | 8/2002 | Boneh | H04L 67/02 |
| | | | 713/182 |
| 2002/0141592 A1* | 10/2002 | Aull | G06F 21/604 |
| | | | 380/282 |
| 2003/0051054 A1* | 3/2003 | Redlich | H04L 63/20 |
| | | | 709/206 |
| 2003/0056093 A1* | 3/2003 | Huitema | H04L 67/104 |
| | | | 713/156 |
| 2003/0088697 A1 | 5/2003 | Matsuhira | |
| 2003/0115455 A1 | 6/2003 | Aull | |
| 2003/0120949 A1* | 6/2003 | Redlich | C07K 14/70575 |
| | | | 726/21 |
| 2003/0135752 A1* | 7/2003 | Sokolic | G06Q 20/382 |
| | | | 726/21 |
| 2003/0140312 A1* | 7/2003 | Mohan | H04L 67/561 |
| | | | 715/224 |
| 2003/0163529 A1* | 8/2003 | Yamaguchi | H04N 1/32502 |
| | | | 709/206 |
| 2003/0182423 A1* | 9/2003 | Shafir | H04L 63/0428 |
| | | | 709/225 |
| 2003/0182435 A1* | 9/2003 | Redlich | G06F 21/62 |
| | | | 726/16 |
| 2003/0188159 A1* | 10/2003 | Josset | H04L 12/1836 |
| | | | 713/163 |
| 2003/0223586 A1* | 12/2003 | Green | H04L 63/029 |
| | | | 380/283 |
| 2004/0003247 A1* | 1/2004 | Fraser | H04L 67/104 |
| | | | 713/169 |
| 2004/0030921 A1* | 2/2004 | Aldridge | G06F 21/10 |
| | | | 726/4 |
| 2004/0078596 A1* | 4/2004 | Kent, Jr. | H04L 69/08 |
| | | | 713/160 |
| 2004/0122958 A1 | 6/2004 | Wardrop | |
| 2004/0133774 A1* | 7/2004 | Callas | H04L 63/0823 |
| | | | 713/153 |
| 2004/0166834 A1* | 8/2004 | Omar | H04W 4/18 |
| | | | 707/E17.116 |
| 2004/0168152 A1 | 8/2004 | Kramer | |
| 2004/0170155 A1* | 9/2004 | Omar | H04L 67/565 |
| | | | 370/352 |
| 2004/0181469 A1* | 9/2004 | Saeki | H04L 63/123 |
| | | | 705/30 |
| 2004/0199596 A1 | 10/2004 | Nutkis | |
| 2004/0210754 A1* | 10/2004 | Barron | H04L 63/0853 |
| | | | 713/153 |
| 2005/0005097 A1* | 1/2005 | Murakawa | H04L 63/0823 |
| | | | 713/156 |
| 2005/0069136 A1 | 3/2005 | Thornton | |
| 2005/0071630 A1* | 3/2005 | Thornton | H04L 9/3226 |
| | | | 713/156 |
| 2005/0074124 A1 | 4/2005 | Thornton | |
| 2005/0076199 A1 | 4/2005 | Thornton | |
| 2005/0076203 A1 | 4/2005 | Thornton | |
| 2005/0076205 A1 | 4/2005 | Thornton | |
| 2005/0078830 A1 | 4/2005 | Thornton | |
| 2005/0081025 A1 | 4/2005 | Thornton | |
| 2005/0081027 A1 | 4/2005 | Thornton | |
| 2005/0081028 A1 | 4/2005 | Thornton | |
| 2005/0086339 A1* | 4/2005 | Krishnan | H04L 47/32 |
| | | | 709/223 |
| 2005/0086479 A1* | 4/2005 | Ondet | G06F 21/10 |
| | | | 713/172 |
| 2005/0091484 A1 | 4/2005 | Thornton | |
| 2005/0091485 A1 | 4/2005 | Imai | |
| 2005/0125670 A1* | 6/2005 | Sozzani | H04L 63/062 |
| | | | 713/171 |
| 2005/0138110 A1* | 6/2005 | Redlich | G06F 21/6254 |
| | | | 709/201 |
| 2005/0182931 A1* | 8/2005 | Robert | H04N 21/4408 |
| | | | 713/168 |
| 2005/0188196 A1* | 8/2005 | Kakii | H04L 9/3263 |
| | | | 713/156 |
| 2005/0223415 A1* | 10/2005 | Oho | G06F 21/606 |
| | | | 713/176 |
| 2005/0273850 A1* | 12/2005 | Freund | H04L 63/20 |
| | | | 726/14 |
| 2005/0278565 A1* | 12/2005 | Frattura | H04L 63/0407 |
| | | | 714/5.1 |
| 2005/0283620 A1* | 12/2005 | Khulusi | H04L 63/0421 |
| | | | 713/185 |
| 2006/0005044 A1* | 1/2006 | Uchikawa | H04L 63/104 |
| | | | 713/168 |
| 2006/0018473 A1* | 1/2006 | Hori | G11B 20/0021 |
| | | | 380/255 |
| 2006/0020782 A1* | 1/2006 | Kakii | H04L 9/3273 |
| | | | 713/156 |
| 2006/0023887 A1* | 2/2006 | Agrawal | H04W 12/047 |
| | | | 380/277 |
| 2006/0075135 A1* | 4/2006 | Rambhia | H04L 63/0428 |
| | | | 709/238 |
| 2006/0075228 A1* | 4/2006 | Black | H04L 63/104 |
| | | | 713/167 |
| 2006/0088157 A1* | 4/2006 | Fujii | H04L 9/0858 |
| | | | 380/30 |
| 2006/0095969 A1 | 5/2006 | Portolani | |
| 2006/0106866 A1* | 5/2006 | Green | H04L 67/02 |
| | | | 709/224 |
| 2006/0136327 A1 | 6/2006 | You | |
| 2006/0155984 A1* | 7/2006 | Tsuchida | H04L 41/0856 |
| | | | 713/156 |
| 2006/0174123 A1* | 8/2006 | Hackett | G06F 21/6245 |
| | | | 713/175 |

(56) References Cited

U.S. PATENT DOCUMENTS

| | | | |
|---|---|---|---|
| 2006/0179299 A1* | 8/2006 | Tanimoto | H04L 63/12 713/158 |
| 2006/0200854 A1* | 9/2006 | Saito | H04L 9/3247 713/176 |
| 2006/0210071 A1* | 9/2006 | Chandran | H04L 63/0428 380/42 |
| 2006/0218403 A1* | 9/2006 | Sauve | H04L 63/126 713/175 |
| 2006/0222013 A1* | 10/2006 | Ban | H04L 63/0428 370/474 |
| 2006/0242302 A1* | 10/2006 | Walker | G06Q 10/06 709/227 |
| 2006/0242703 A1* | 10/2006 | Abeni | H04L 63/1408 726/23 |
| 2006/0259430 A1* | 11/2006 | Terada | G06Q 20/105 705/50 |
| 2006/0259782 A1* | 11/2006 | Wang | G06F 21/6245 713/189 |
| 2006/0294381 A1* | 12/2006 | Mitchell | H04L 9/3263 713/173 |
| 2007/0005980 A1* | 1/2007 | Miyazawa | H04L 63/0428 713/176 |
| 2007/0005981 A1* | 1/2007 | Miyazawa | H04L 9/3268 713/176 |
| 2007/0011158 A1* | 1/2007 | Parikh | H04L 63/20 |
| 2007/0038853 A1* | 2/2007 | Day | H04L 63/0281 713/153 |
| 2007/0055865 A1* | 3/2007 | Kakii | H04L 9/3263 713/156 |
| 2007/0056046 A1 | 3/2007 | Claudatos | |
| 2007/0079117 A1* | 4/2007 | Bhogal | H04L 9/00 713/160 |
| 2007/0118739 A1* | 5/2007 | Togashi | G06Q 10/10 713/158 |
| 2007/0124809 A1* | 5/2007 | Narin | G06F 21/10 726/6 |
| 2007/0133803 A1* | 6/2007 | Saito | H04L 61/4547 380/267 |
| 2007/0168663 A1 | 7/2007 | Hirai | |
| 2007/0234034 A1* | 10/2007 | Leone | H04W 12/033 713/150 |
| 2007/0234061 A1 | 10/2007 | Teo | |
| 2007/0261112 A1* | 11/2007 | Todd | H04L 63/1483 726/2 |
| 2007/0263874 A1* | 11/2007 | Harran | H04L 63/062 380/277 |
| 2007/0276958 A1* | 11/2007 | Curtis | H04L 63/0471 709/238 |
| 2007/0283152 A1* | 12/2007 | Kudo | H04N 1/00278 713/168 |
| 2008/0021834 A1* | 1/2008 | Holla | G16H 80/00 705/51 |
| 2008/0022099 A1 | 1/2008 | Kawano | |
| 2008/0022374 A1* | 1/2008 | Brown | H04L 63/0823 726/5 |
| 2008/0040790 A1* | 2/2008 | Kuo | G06F 21/604 726/22 |
| 2008/0077976 A1* | 3/2008 | Schulz | H04L 9/3249 726/5 |
| 2008/0082830 A1 | 4/2008 | Goulet | |
| 2008/0082834 A1* | 4/2008 | Mattsson | G06F 12/1408 715/765 |
| 2008/0152145 A1* | 6/2008 | Fujioka | G06F 21/6245 709/202 |
| 2008/0172745 A1* | 7/2008 | Reinart | G06F 21/6209 726/26 |
| 2008/0183902 A1 | 7/2008 | Cooper | |
| 2008/0226069 A1* | 9/2008 | Tan | H04L 63/1475 380/255 |
| 2008/0276098 A1* | 11/2008 | Florencio | G06F 21/46 713/183 |
| 2008/0289023 A1 | 11/2008 | Wardrop | |
| 2008/0295180 A1* | 11/2008 | Yoneda | G06F 21/33 713/193 |
| 2008/0320566 A1 | 12/2008 | Herzog | |
| 2009/0013399 A1* | 1/2009 | Cottrell | H04L 63/0421 726/12 |
| 2009/0044266 A1 | 2/2009 | Sharp | |
| 2009/0049557 A1* | 2/2009 | Friedman | G06F 21/606 726/27 |
| 2009/0066788 A1* | 3/2009 | Baum | H04L 12/2818 375/E7.076 |
| 2009/0066789 A1* | 3/2009 | Baum | G06F 16/954 375/240.01 |
| 2009/0070436 A1* | 3/2009 | Dawes | G06Q 50/16 709/219 |
| 2009/0070473 A1* | 3/2009 | Baum | H04L 67/025 709/227 |
| 2009/0070477 A1* | 3/2009 | Baum | H04L 12/2818 709/231 |
| 2009/0070681 A1* | 3/2009 | Dawes | H04N 7/181 345/173 |
| 2009/0070682 A1* | 3/2009 | Dawes | H04L 67/025 715/736 |
| 2009/0070692 A1* | 3/2009 | Dawes | H04L 12/2818 715/764 |
| 2009/0074184 A1* | 3/2009 | Baum | G06F 16/954 709/201 |
| 2009/0077104 A1* | 3/2009 | Sheets | G06F 21/64 |
| 2009/0077167 A1* | 3/2009 | Baum | G06F 16/40 709/225 |
| 2009/0077623 A1* | 3/2009 | Baum | H04L 12/2818 709/224 |
| 2009/0077624 A1* | 3/2009 | Baum | H04L 12/2809 709/227 |
| 2009/0083548 A1* | 3/2009 | Dettinger | G06F 21/6245 713/193 |
| 2009/0092247 A1* | 4/2009 | Kido | H04L 9/3263 380/30 |
| 2009/0113201 A1* | 4/2009 | Mackey | H04L 9/00 713/161 |
| 2009/0119512 A1 | 5/2009 | Bullard, Jr. | |
| 2009/0119661 A1* | 5/2009 | Bernoth | G06F 8/656 717/176 |
| 2009/0122986 A1* | 5/2009 | Tahan | H04L 9/0833 380/255 |
| 2009/0144382 A1* | 6/2009 | Benninghoff, III | H04L 63/126 709/206 |
| 2009/0147292 A1* | 6/2009 | Shimura | H04N 1/00854 358/1.14 |
| 2009/0204807 A1* | 8/2009 | Bolin | H04W 4/20 713/155 |
| 2009/0217040 A1* | 8/2009 | Nasu | H04L 9/3263 713/168 |
| 2009/0222663 A1* | 9/2009 | Chow | H04L 9/3263 713/170 |
| 2009/0232300 A1* | 9/2009 | Zucker | H04L 63/0428 380/2 |
| 2009/0249084 A1* | 10/2009 | Ogawa | H04L 9/0897 713/193 |
| 2009/0271842 A1* | 10/2009 | Baumhof | H04L 63/1483 726/1 |
| 2009/0282474 A1* | 11/2009 | Chen | G06F 21/53 726/21 |
| 2009/0287837 A1* | 11/2009 | Felsher | G06F 21/6245 709/229 |
| 2009/0327695 A1* | 12/2009 | Molsberry | H04L 63/20 713/153 |
| 2010/0017596 A1* | 1/2010 | Schertzinger | H04L 63/062 713/155 |
| 2010/0023865 A1* | 1/2010 | Fulker | G08B 25/14 700/286 |
| 2010/0030897 A1 | 2/2010 | Stradling | |
| 2010/0031036 A1* | 2/2010 | Chauncey | H04W 12/033 713/168 |
| 2010/0034383 A1* | 2/2010 | Turk | H04L 9/0891 380/44 |

(56) References Cited

U.S. PATENT DOCUMENTS

| | | | |
|---|---|---|---|
| 2010/0067706 A1* | 3/2010 | Anan | H04L 9/0825 380/28 |
| 2010/0088766 A1 | 4/2010 | Michaely | |
| 2010/0111300 A1* | 5/2010 | Kido | H04L 63/0823 380/46 |
| 2010/0131551 A1 | 5/2010 | Benzaken | |
| 2010/0131758 A1* | 5/2010 | Ben-Natan | H04L 9/3271 719/331 |
| 2010/0146260 A1* | 6/2010 | Levow | H04L 63/0464 713/154 |
| 2010/0153704 A1* | 6/2010 | Winslow | H04L 63/10 713/153 |
| 2010/0153853 A1* | 6/2010 | Dawes | H04L 12/2809 709/227 |
| 2010/0162347 A1* | 6/2010 | Barile | G06F 21/552 726/1 |
| 2010/0169499 A1* | 7/2010 | Ristock | H04W 12/02 370/352 |
| 2010/0175136 A1* | 7/2010 | Frumer | H04L 63/0428 726/26 |
| 2010/0189253 A1* | 7/2010 | Brown | H04L 9/3231 380/30 |
| 2010/0202455 A1* | 8/2010 | Sundaram | H04L 63/0428 455/435.1 |
| 2010/0235640 A1* | 9/2010 | Satoh | H04L 9/3263 713/169 |
| 2010/0251329 A1* | 9/2010 | Wei | H04L 67/1001 726/1 |
| 2010/0275012 A1* | 10/2010 | Kido | H04L 63/0823 380/44 |
| 2010/0299520 A1 | 11/2010 | Murakawa | |
| 2010/0299525 A1 | 11/2010 | Shah | |
| 2010/0306545 A1* | 12/2010 | Seki | H04L 63/0823 709/206 |
| 2010/0318789 A1 | 12/2010 | Teal | |
| 2011/0035585 A1* | 2/2011 | Haddad | H04W 12/02 713/168 |
| 2011/0035595 A1 | 2/2011 | Bartram | |
| 2011/0055563 A1* | 3/2011 | Chandran | H04L 63/06 713/168 |
| 2011/0072269 A1* | 3/2011 | Takechi | G06F 21/10 713/150 |
| 2011/0087872 A1* | 4/2011 | Shah | G06F 21/74 713/2 |
| 2011/0145918 A1* | 6/2011 | Jung | G06F 21/52 726/22 |
| 2011/0154016 A1* | 6/2011 | Niccolini | H04L 65/1079 713/150 |
| 2011/0154021 A1 | 6/2011 | Mccann | |
| 2011/0161656 A1* | 6/2011 | Rao | H04L 63/0281 713/168 |
| 2011/0161660 A1* | 6/2011 | Zhang | H04L 63/0869 708/250 |
| 2011/0191578 A1 | 8/2011 | Hayes | |
| 2011/0202755 A1* | 8/2011 | Orsini | H04L 63/0272 713/151 |
| 2011/0209222 A1 | 8/2011 | Sharp | |
| 2011/0211699 A1* | 9/2011 | Ma | H04L 9/0877 380/278 |
| 2011/0225425 A1* | 9/2011 | Kotla | H04L 9/3263 713/181 |
| 2011/0258123 A1* | 10/2011 | Dawkins | H04L 63/0428 705/64 |
| 2011/0264905 A1* | 10/2011 | Ovsiannikov | H04L 63/166 713/151 |
| 2011/0274277 A1* | 11/2011 | Hennebert | H04L 63/0442 380/273 |
| 2011/0302653 A1* | 12/2011 | Frantz | G06F 21/552 726/22 |
| 2011/0314284 A1* | 12/2011 | Chou | H04L 9/3273 713/169 |
| 2012/0017086 A1* | 1/2012 | Chu | H04L 63/0823 713/171 |
| 2012/0035871 A1* | 2/2012 | Cofta | H01L 31/042 702/62 |
| 2012/0066769 A1* | 3/2012 | Latchem | G06F 21/6263 726/26 |
| 2012/0078727 A1 | 3/2012 | Lee | |
| 2012/0096268 A1* | 4/2012 | Dogu | H04L 51/00 713/170 |
| 2012/0117639 A1 | 5/2012 | Bouz | |
| 2012/0144492 A1* | 6/2012 | Griffin | G06F 21/56 726/25 |
| 2012/0166582 A1* | 6/2012 | Binder | G06F 21/602 709/217 |
| 2012/0173874 A1 | 7/2012 | Brown | |
| 2012/0174196 A1 | 7/2012 | Bhogavilli | |
| 2012/0198235 A1* | 8/2012 | Kotla | H04L 9/3236 713/171 |
| 2012/0204032 A1* | 8/2012 | Wilkins | H04L 9/321 713/170 |
| 2012/0221473 A1* | 8/2012 | Redmann | G06Q 20/3829 705/50 |
| 2012/0227102 A1 | 9/2012 | Parla | |
| 2012/0246472 A1* | 9/2012 | Berengoltz | H04L 9/0897 713/165 |
| 2012/0246475 A1 | 9/2012 | Yoo | |
| 2012/0278453 A1* | 11/2012 | Baum | H04L 67/125 709/220 |
| 2012/0297473 A1* | 11/2012 | Case | H04W 4/70 726/10 |
| 2012/0314856 A1* | 12/2012 | Zaverucha | H04L 9/007 380/44 |
| 2012/0317412 A1* | 12/2012 | Zaverucha | H04L 9/3265 713/176 |
| 2012/0326847 A1* | 12/2012 | Strauman | H04W 4/80 340/10.4 |
| 2012/0331300 A1* | 12/2012 | Das | G06F 3/1454 713/176 |
| 2013/0019099 A1* | 1/2013 | Vanstone | H04L 9/3066 713/171 |
| 2013/0019309 A1* | 1/2013 | Strayer | G06N 5/04 726/23 |
| 2013/0024382 A1* | 1/2013 | Dala | H04L 63/0464 705/51 |
| 2013/0046972 A1* | 2/2013 | Campagna | H04L 9/3263 713/156 |
| 2013/0054467 A1* | 2/2013 | Dala | G06F 21/6245 705/51 |
| 2013/0054962 A1* | 2/2013 | Chawla | H04W 12/06 713/156 |
| 2013/0057895 A1* | 3/2013 | Okazawa | G06F 21/33 358/1.14 |
| 2013/0061038 A1 | 3/2013 | Pao | |
| 2013/0097652 A1* | 4/2013 | Bhattacharjee | H04L 63/1408 726/1 |
| 2013/0097656 A1 | 4/2013 | Kennedy | |
| 2013/0111220 A1* | 5/2013 | Friedlander | H04L 63/0428 713/193 |
| 2013/0135118 A1* | 5/2013 | Ricci | G06F 3/04842 340/932.2 |
| 2013/0138964 A1* | 5/2013 | Joyce, III | H04L 9/3231 713/176 |
| 2013/0145151 A1 | 6/2013 | Brown | |
| 2013/0159021 A1* | 6/2013 | Felsher | G16H 10/60 705/3 |
| 2013/0159711 A1* | 6/2013 | Kaal | H04L 65/1069 713/168 |
| 2013/0179826 A1* | 7/2013 | Wang | G06Q 90/205 715/764 |
| 2013/0212026 A1* | 8/2013 | Powell | H04L 9/0894 705/76 |
| 2013/0212383 A1 | 8/2013 | Hallin | |
| 2013/0219176 A1 | 8/2013 | Akella | |
| 2013/0227281 A1* | 8/2013 | Kounga | G06F 21/6209 713/165 |

(56) References Cited

U.S. PATENT DOCUMENTS

| | | | |
|---|---|---|---|
| 2013/0239169 A1* | 9/2013 | Nakhjiri | H04L 63/20 726/1 |
| 2013/0247144 A1 | 9/2013 | Marshall | |
| 2013/0304884 A1* | 11/2013 | Hymel | H04L 69/40 709/222 |
| 2013/0305050 A1* | 11/2013 | Johnson | H04L 9/3215 713/175 |
| 2013/0339345 A1* | 12/2013 | Soto Matamala | G06F 16/248 707/722 |
| 2014/0020082 A1 | 1/2014 | Leggette | |
| 2014/0032896 A1* | 1/2014 | Chhabra | H04L 63/0464 713/150 |
| 2014/0068252 A1* | 3/2014 | Maruti | H04L 9/0866 713/162 |
| 2014/0075185 A1 | 3/2014 | Dragomir | |
| 2014/0075186 A1* | 3/2014 | Austen | H04L 63/061 713/156 |
| 2014/0082359 A1* | 3/2014 | Nakhjiri | H04L 9/3066 713/168 |
| 2014/0115702 A1* | 4/2014 | Li | H04L 63/0464 726/23 |
| 2014/0119540 A1 | 5/2014 | Pearson | |
| 2014/0134980 A1 | 5/2014 | Singh | |
| 2014/0136838 A1* | 5/2014 | Mossbarger | H04L 63/0823 713/156 |
| 2014/0137188 A1* | 5/2014 | Bartholomay | H04L 63/0428 709/224 |
| 2014/0143851 A1* | 5/2014 | Baum | G08B 25/008 726/12 |
| 2014/0143852 A1* | 5/2014 | Cottrell | H04L 67/56 726/12 |
| 2014/0150060 A1* | 5/2014 | Riley | H04L 63/0428 726/26 |
| 2014/0157370 A1* | 6/2014 | Plattner | H04L 63/06 726/4 |
| 2014/0164779 A1 | 6/2014 | Hartley | |
| 2014/0165137 A1* | 6/2014 | Balinsky | G06F 21/6245 726/1 |
| 2014/0167928 A1* | 6/2014 | Burd | H04L 12/2818 340/12.5 |
| 2014/0172957 A1* | 6/2014 | Baum | G08B 25/009 709/203 |
| 2014/0173687 A1* | 6/2014 | Dimitrakos | G16H 10/60 726/1 |
| 2014/0181506 A1 | 6/2014 | Resch | |
| 2014/0189119 A1 | 7/2014 | Stuntebeck | |
| 2014/0189356 A1* | 7/2014 | Phegade | G06F 21/84 713/171 |
| 2014/0189808 A1* | 7/2014 | Mahaffey | G06F 21/6245 726/4 |
| 2014/0194094 A1* | 7/2014 | Ahuja | H04W 4/029 455/410 |
| 2014/0195798 A1* | 7/2014 | Brugger | H04L 63/101 713/154 |
| 2014/0201816 A1 | 7/2014 | Brannon | |
| 2014/0201845 A1* | 7/2014 | Anantharam | H04L 63/0245 726/26 |
| 2014/0201846 A1* | 7/2014 | Anantharam | H04L 63/0281 726/26 |
| 2014/0204174 A1* | 7/2014 | Karimi-Cherkandi | H04N 21/6543 348/14.12 |
| 2014/0205092 A1 | 7/2014 | Hartley | |
| 2014/0208111 A1* | 7/2014 | Brandwine | H04L 9/0844 713/171 |
| 2014/0208421 A1* | 7/2014 | Rowney | G06F 21/606 726/22 |
| 2014/0244513 A1* | 8/2014 | Ballesteros | G06F 21/74 705/64 |
| 2014/0258709 A1* | 9/2014 | Takeda | H04L 63/0823 713/156 |
| 2014/0258711 A1 | 9/2014 | Brannon | |
| 2014/0258715 A1* | 9/2014 | Rodniansky | G06F 21/6227 713/162 |
| 2014/0282949 A1* | 9/2014 | Nath | G06F 16/9535 726/6 |
| 2014/0310277 A1* | 10/2014 | Ricci | H04W 76/11 707/736 |
| 2014/0337619 A1 | 11/2014 | Brown | |
| 2014/0337925 A1 | 11/2014 | Marshall | |
| 2014/0344890 A1* | 11/2014 | Warrick | H04L 61/4511 726/1 |
| 2014/0359280 A1 | 12/2014 | Saboor | |
| 2014/0365372 A1* | 12/2014 | Ross | G06F 21/6263 726/26 |
| 2015/0019869 A1* | 1/2015 | Walker | G06F 21/33 713/171 |
| 2015/0040217 A1* | 2/2015 | Abuelsaad | H04L 63/1408 726/22 |
| 2015/0054947 A1* | 2/2015 | Dawes | G08B 13/19682 348/143 |
| 2015/0074392 A1* | 3/2015 | Boivie | G06F 21/6245 713/164 |
| 2015/0106624 A1* | 4/2015 | Gero | H04L 63/0823 713/171 |
| 2015/0120943 A1* | 4/2015 | Slupik | H04L 63/0272 709/227 |
| 2015/0135338 A1 | 5/2015 | Moskal | |
| 2015/0180829 A1* | 6/2015 | Yu | H04L 63/083 726/11 |
| 2015/0193637 A1* | 7/2015 | Booth | G06F 21/53 726/30 |
| 2015/0195086 A1 | 7/2015 | Davison | |
| 2015/0195299 A1* | 7/2015 | Zoldi | H04L 67/30 726/25 |
| 2015/0261813 A1* | 9/2015 | Pappula | H04L 67/535 707/758 |
| 2015/0271153 A1 | 9/2015 | Rohloff | |
| 2015/0312222 A1* | 10/2015 | Raguso | H04L 67/1097 713/171 |
| 2015/0324593 A1* | 11/2015 | Abuelsaad | H04L 63/168 726/26 |
| 2015/0326395 A1* | 11/2015 | Lemke | H04L 9/3226 713/155 |
| 2015/0341169 A1 | 11/2015 | Leppanen | |
| 2015/0351084 A1* | 12/2015 | Werb | H04W 12/08 370/329 |
| 2015/0365385 A1 | 12/2015 | Hore | |
| 2015/0372994 A1* | 12/2015 | Stuntebeck | H04W 12/02 713/156 |
| 2015/0381579 A1 | 12/2015 | Lundin | |
| 2016/0028547 A1 | 1/2016 | Yao | |
| 2016/0028548 A1 | 1/2016 | Yao | |
| 2016/0035182 A1* | 2/2016 | Kruglick | H04L 67/34 463/29 |
| 2016/0119292 A1 | 4/2016 | Kaseda | |
| 2016/0227148 A1* | 8/2016 | Griffith | G01N 25/72 |
| 2016/0373262 A1 | 12/2016 | Shearer | |
| 2017/0006004 A1* | 1/2017 | Li | H04L 41/0806 |
| 2017/0111312 A1 | 4/2017 | Martini | |
| 2017/0262490 A1* | 9/2017 | Tholfsen | G06F 3/0482 |
| 2017/0337386 A1* | 11/2017 | Kumaresan | G06F 21/604 |
| 2017/0339111 A1* | 11/2017 | Balabine | H04L 9/0861 |
| 2018/0034632 A1 | 2/2018 | De Atley | |
| 2018/0096021 A1 | 4/2018 | Lotzer | |
| 2018/0124025 A1 | 5/2018 | Lam | |
| 2018/0167204 A1 | 6/2018 | Wall | |
| 2018/0167367 A1 | 6/2018 | John | |
| 2018/0191720 A1* | 7/2018 | Dawes | H04L 69/08 |
| 2018/0191740 A1* | 7/2018 | Decenzo | H04L 63/02 |
| 2018/0191741 A1* | 7/2018 | Dawes | H04W 12/069 |
| 2018/0191742 A1* | 7/2018 | Dawes | H04L 63/08 |
| 2018/0197387 A1* | 7/2018 | Dawes | H04L 67/10 |
| 2018/0198756 A1* | 7/2018 | Dawes | G06F 21/00 |
| 2018/0219976 A1* | 8/2018 | Decenzo | H04L 65/612 |
| 2018/0234256 A1 | 8/2018 | Bowen | |
| 2018/0276390 A1 | 9/2018 | Grafi | |
| 2018/0287792 A1 | 10/2018 | Fu | |
| 2018/0295109 A1 | 10/2018 | Wang | |

(56) References Cited

U.S. PATENT DOCUMENTS

| | | | |
|---|---|---|---|
| 2018/0367575 | A1 | 12/2018 | Narayanaswamy |
| 2020/0074106 | A1* | 3/2020 | Narayanaswamy ........................ G06F 21/6227 |
| 2020/0160388 | A1* | 5/2020 | Sabeg ................ G06Q 30/0269 |
| 2020/0380176 | A1* | 12/2020 | Pauley, Jr. .............. G06F 21/84 |
| 2021/0089672 | A1* | 3/2021 | Suzuki ................ G06F 21/6218 |
| 2022/0398319 | A1* | 12/2022 | Cho .................... G06F 12/1458 |

OTHER PUBLICATIONS

Ateniese et al "Key-Private Proxy Re-Encryption," Jan. 22, 2009, pp. 1-16 (Year: 2009).*

Wang et al "On DDos Attack Against Proxy in Proxy Re-encryption and Proxy Re-signature," IEEE Ninth International Conference on Computer and Informaiton Technology, pp. 213-218 (Year: 2009).*

Feng et al "A Secure Proxy Signature Scheme in Bilinear Group," 2013 Fourth International Conference on Emerging Intelligent Data and Web Technologies, p. 555-557 (Year: 2013).*

Zhang et al "Non-Transitive Bidirectional Proxy Re-Encryption Scheme," 2009 International Conference on Networking and Digital Society, IEEE Computer Society, pp. 213-216 (Year: 2009).*

Wang et al "On DDos Attack against Proxy in Proxy Re-Encryption and Proxy Re-Signature," IEEE Ninth International Conference on Computer and Information Technology, IEEE Computer Society, pp. 213-218 (Year: 2009).*

Wang et al "Proxy Re-Encryption Scheme from IBE to CBE," 2009 First International Workshop on Database Technology and Applications, IEEE Computer Society, pp. 99-102 (Year: 2009).*

Vijayarani et al "An Efficient Masking Technique for Sensitive Data Protection," IEEE International Conference on Recent Trends in Information Technology, ICRTIT pp. 1245-1249 (Year: 2011).*

Ding et al "Identity Based Proxy Re-Encryption Based on a Variant of BB1 Identity Based Encryption," 2010 Second International Conference on Networks Security, Wireless Communication and Trusted Computing, IEEE Computer Society, pp. 506-509 ( Year: 2010).*

Sur et al "Certificate-Based Proxy Re-Encryption for Public Cloud Storage," 2013 Seventh International Conference on Innovative Mobile and Internet Services in Ubiquitous Computing, pp. 159-166 (Year: 2013).*

Jin et al "Anonymous Deduplication of Encrypted Data with Proof of Ownership in Cloud Storage, " 2013 2nd IEEE/CIC International Conference on Communications in China (ICCC): QRS, QoS, Reliability and Security, pp. 224-229, (Year: 2013).*

"End-to-End Protection of Sensitive Information in Web Services", Burnside-Fi3ldCrypt, 2009, 491-506.

"Mobile Device Management Administrator Guide Apple IOS", Telstra, Feb. 2012, 1-44.

"The Secure Sockets Layer (SSL) Protocol Version 3.0", RFC 6101, Aug. 2011, 1-67.

Li, et al., "Segment Level Authentication: Combating Internet Source Spoofing." IEEE, pp. 209-212 (Year: 2010).

Liang, et al , "Attribute Based Proxy Re-Encryption with Delegating Capabilities", 2009, 276-286.

Sur , et al., "Certificate Based Proxy Re-Encryption for Public Cloud Storage." 2013 Seventh International Conference on Innovative Mobile and Internet Systems in Ubiquotous Computing, pp. 159-166 (Year: 2013).

* cited by examiner

CRYPTOGRAPHIC PROXY SERVICE

This patent application is a continuation of U.S. patent application Ser. No. 16/595,818 ("Cryptographic Proxy Service"), which is a continuation of U.S. patent application Ser. No. 15/439,349 ("Cryptographic Proxy Service"), which is a divisional of U.S. patent application Ser. No. 14/311,385 ("Cryptographic Proxy Service"), filed Jun. 23, 2014, all of which are expressly incorporated herein in their entireties.

BACKGROUND

A cryptographic proxy service for network traffic may be provided. In increasing numbers of situations, individuals and enterprises desire for their network traffic to be encrypted between the source and destination. For example, users want their email, instant messages (IMs), social media posts, web pages, etc. to be encrypted to prevent third parties from seeing the contents and topics on which they are communicating. Conventional solutions offer the use of certificates and cryptographic key pairs, but these solutions require specific set up by the user before they can be utilized and a separate setup process must be undergone for each destination site.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
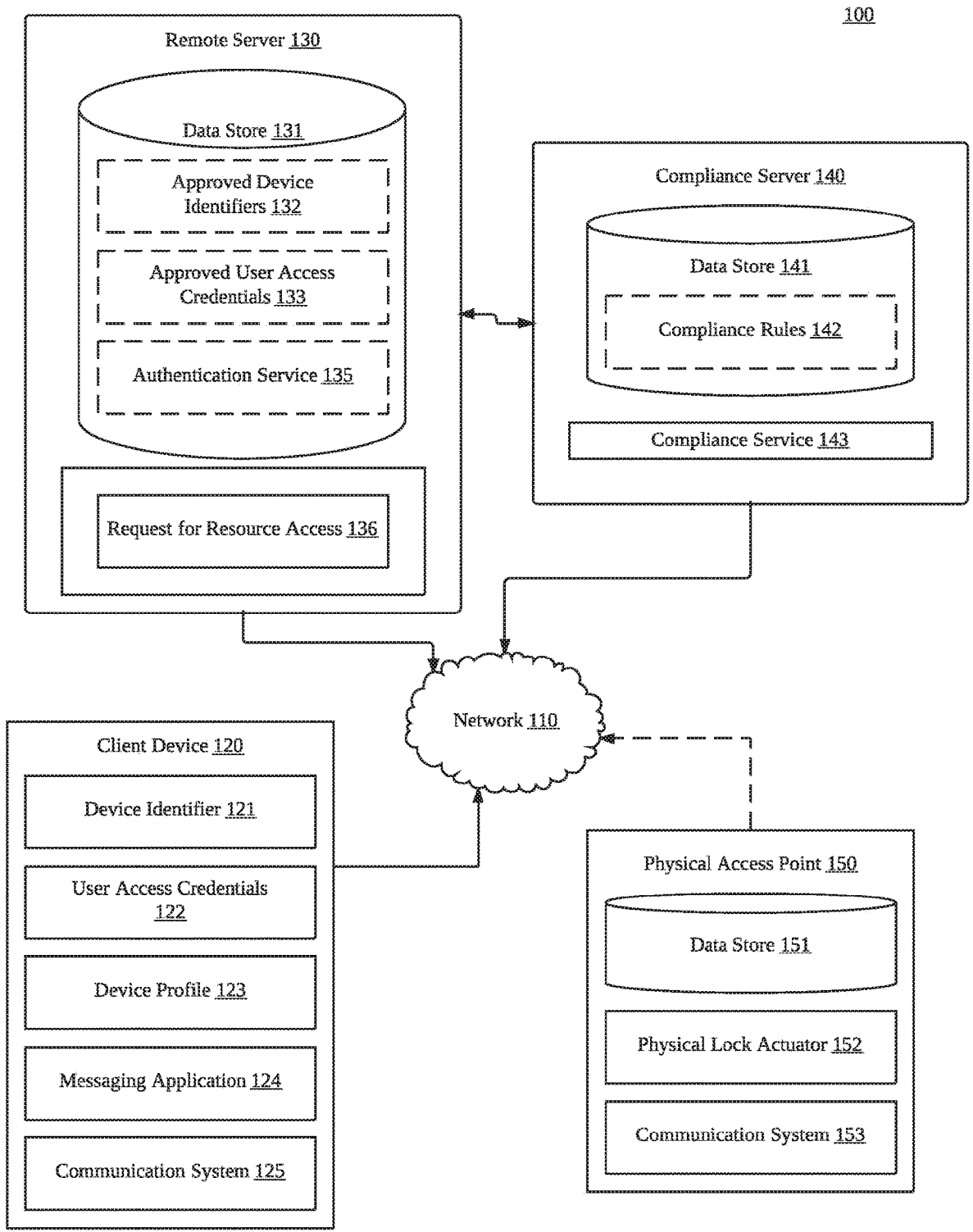
FIG. 1 is a block diagram of an operating environment for providing device management.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Cryptographic proxy services may be provided for inbound and outbound network traffic on managed devices. For example, a user of a managed device may wish to submit data to a website, such as a wiki page or a social media site that does not provide for end-to-end encryption. Upon determining that the data may contain sensitive information (e.g., because it's being submitted to a site that requires a login to view, or because it contains personally identifiable information), the managed device may contact a cryptographic proxy service to aid in securing the data.

The cryptographic proxy service may comprise a certificate authority for which a root certificate is installed on the managed device. The proxy may thereby generate a spoofed certificate for the target of the data (e.g., the website, another managed device, an application server, etc.) and allow the device to encrypt the data before transmitting it to the proxy service. The proxy service may then negotiate a secure communication with the target of the data and re-encrypt the data in a format that the destination will be able to decrypt and process. This allows the proxy service to offload the security negotiations so that the managed device need not keep track of how to securely communicate with a large number of data destinations.

In some embodiments, users, applications, and/or their devices may be required to comply with management and/or security policies in order to request resources, use certain features and/or to communicate with other users at all. For example, a device may need to comply with various security checks such as virus or malware scans, which applications and/or protocols may be used, operating system integrity (e.g., not be 'rooted', 'jailbroken', or otherwise hacked), and/or user, group, and/or device authorizations. Management policies may restrict factors such as times and/or locations in which such messages may be sent and/or received, a quota of resources that may be used by such messaging, who may exchange messages with whom, and/or which user preferences and/or settings may be enforceable.

Compliance with management and/or security policies may be required by an enterprise to prevent remediation actions from being taken. For example, a management policy may require that a device have a passcode set, that a specific application be used for real-time communications, and that only users within the same user group may be messaged during working hours. Security policies may restrict encryption of the message traffic to an encryption key assigned by the enterprise, so that messages may be logged and/or audited, and may prohibit the sending of files or images. Failure to comply with these policies may result, for example, in restricting an input from being transmitted at all, overriding a user preference associated with the application (e.g., using the enterprise encryption key instead of a personal key), and/or preventing the establishment of a communication session between the users at all.

The security policies may further comprise requirements to protect the content of the communication from unauthorized users. For example, a notification message on the receiving user's device may be prohibited from displaying any and/or all of the contents of the communication until an authorization, such as a passcode or encryption key password, has been entered. In some embodiments, the message may be displayed, but the contents may be obfuscated, such as by blurring or covering text with black boxes. Other restrictions may prevent any and/or all devices participating in the communication from capturing the contents of the message, such as by preventing logging and/or disabling screen capture capabilities. A further refinement may vary a refresh rate associated with different portions of a display of the contents such that attempts to photograph the screen may be blocked or at least allowed to capture only portions of those contents.

The technical effects of some embodiments of this disclosure may include establishing control of access to networks and resources for user devices when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9AM and 5PM at the current location of the user device, and to disable business configuration profiles and enable personal configuration profiles while the current time is between 5PM and 9AM at the current location of the user device.

FIG. 1 illustrates a networked environment 100 according to various embodiments. The networked environment 100 includes a network 110, a client device 120, a remote server 130, a compliance server 140, and a physical access point 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. It should be understood that embodiments described herein may be used to advantage in any type or combination of wired and/or wireless networks.

In some embodiments, the network 110 facilitates the transport of data between at least one client device, such as client device 120, the remote server 130, the compliance server 140, and the physical access point 150. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver (including an RFID transceiver), near-field communications (NFC) transceiver, and/or the like. Additionally, the client device 120 may include a processor for executing applications and/or services, and a memory accessible by the processor to store data and other information. The client device 120 is operable to communicate wirelessly with the remote server 130 and the physical access point 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "messaging application" 124. The messaging application 124 may be executed to exchange real-time communications with other client devices. Communication system 125 may be the same or different than the wireless network connectivity component previously discussed, include the same or different communication abilities, and may at least be specifically able to communicate with physical access points 150, discussed below.

The client device 120 may also be configured to execute other applications such as, for example, browser applications, email applications, physical access applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include an authentication service 135, and may include other applications, services, processes, systems, engines, and/or functionality not discussed in detail herein. As used herein, the term "authentication service" is meant to generally refer to computer-executable instructions for performing the functionality described herein for authorizing and authenticating client device 120. The authentication service 135 is executed to receive a request for access to resources 136 from an application executed on client device 120 and to determine whether to grant or deny the request 136. Upon determining to grant the request 136, the authentication service 135 may then send access credentials.

The data stored in the data store 131 of the remote server 130 may include, for example, approved device identifiers 132, approved user access credentials 133, physical access credentials, resource access credentials, and potentially other data. The approved device identifiers 132 represents a listing of device identifiers 121 that have been pre-approved for potential accessing physical access credentials 134 which may entitle holders of client devices 120 to access to various resources. The approved device identifiers 132 may have been previously provided to the remote server 130 by a system administrator and/or the like. The approved user access credentials 133 represents a listing of user access credentials 122 that have been pre-approved for potential accessing resource credentials.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as client device 120. The compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of management and security policies, hardware restrictions, software restrictions, and/or mobile device management restrictions that may need to be satisfied by the client device 120 prior to granting the request for resource access 136.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given resource(s). In some embodiments, however, the compliance service 143 may not be used and physical access authorization may be determined solely based on approved user access credentials 133 and/or approved device identifiers 132.

A user operating a client device 120 may wish to receive at least one resource(s) so that the user may physical access a building, location, door, gate, drawer, filing cabinet, storage unit, cabinet, etc. In some embodiments, the user may interact with an input device to manipulate a network page displayed by a locally executed application, such as a browser application, to generate the request for resource access 136. In some embodiments, the user may manipulate a user interface generated by a locally executed application to generate the request 136. In either case, the user may provide login information and/or the application may automatically retrieve the login information from the memory of the client device 120. Login information may be, for instance, a unique user name, a password, biometric data, and/or other types of user access credentials 122. The application may then communicate the request to the enterprise access application 124, which may generate and transmit the request 136 to the authentication service 135. In some embodiments, the enterprise access application 124 may itself receive the input from the user directly and then transmit the access request 136 to the remote server 130.

Upon receiving the request 136, the authentication service 135 determines whether to grant or deny the request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the enterprise access application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the enterprise access application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131. In some embodiments, the authentication service 135 may authenticate the user operating the client device 120 without also authenticating the client device 120. In other words, certain authenticated users may be authorized to gain the requested physical access regardless of what device they used to submit the resource request 136.

In some embodiments, having authenticated the client device 120 and the user operating the client device 120 as authorized to receive the resource(s), the authentication service 135 communicates with the compliance service 143 to further authorize the client device 120 to receive the resource(s). In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one resource(s). In some embodiments, the authentication service 135 sends the physical access credentials 134 to the client device 120 and authorizes the client device 120 to use such credentials in connection with accessing physical access points 150. In some embodiments, the authentication service 135 may also send the physical access credentials to physical access point 150.

In some embodiments, the resource(s) may be revoked at any time by the remote server 130. Revocation may occur for any number of reasons, including but not limited to, a change in device profile 123, a change in approved device identifiers 132, a change in approved user access credentials 133, expiration of a defined time period, and/or a request from the user of the client device 120.

In some embodiments, the physical access point 150 is an electro-mechanical device capable of sending and/or receiving information, and in response thereto opening a physical barrier, for example a building, location, door, gate, drawer, filing cabinet, storage unit, cabinet, etc. Depending on the embodiment, the physical access point may or may not be in communication with network 110 and servers and devices connected therewith. In these embodiments, the physical access point may have authorized physical access credentials 134 embedded and/or stored therein, either in a ROM-type storage unit, and/or in a non-networked RAM-type storage unit. A non-networked RAM-type storage unit could be updated locally by direct connection via USB and/or the like, with additional security mechanisms to prevent unwanted tampering/changing of the embedded/stored physical access credentials 134.

The physical access point 150 may include a data store 151 for maintaining data and/or applications which relate to determining whether a client device 120 may be allowed access by the physical access point 150. In some embodiments, the data store 151 may only include a single access code and/or datum that is expected to be matched by any client device 120 providing the same, thereby entitling the client device 120 to access beyond the physical barrier. In some embodiments, the data store 151 may include a plurality of access codes, any of which may be matched by a client device 120 to verify authority to access beyond the physical barrier. The physical access point may have a processor to implement such methods.

The physical access point 150 may also include a physical lock actuator 152, for example, a solenoid and/or other electro-mechanical actuator, which is operable to physically unlock the physical barrier upon command to do so by the physical access point 150. The physical access point may also include a communication system 153 for sending and receiving information with a client device 120 (for example, an RFID transceiver, a wireless radio transceiver, a near field communication device, and/or the like).

Figure 2:
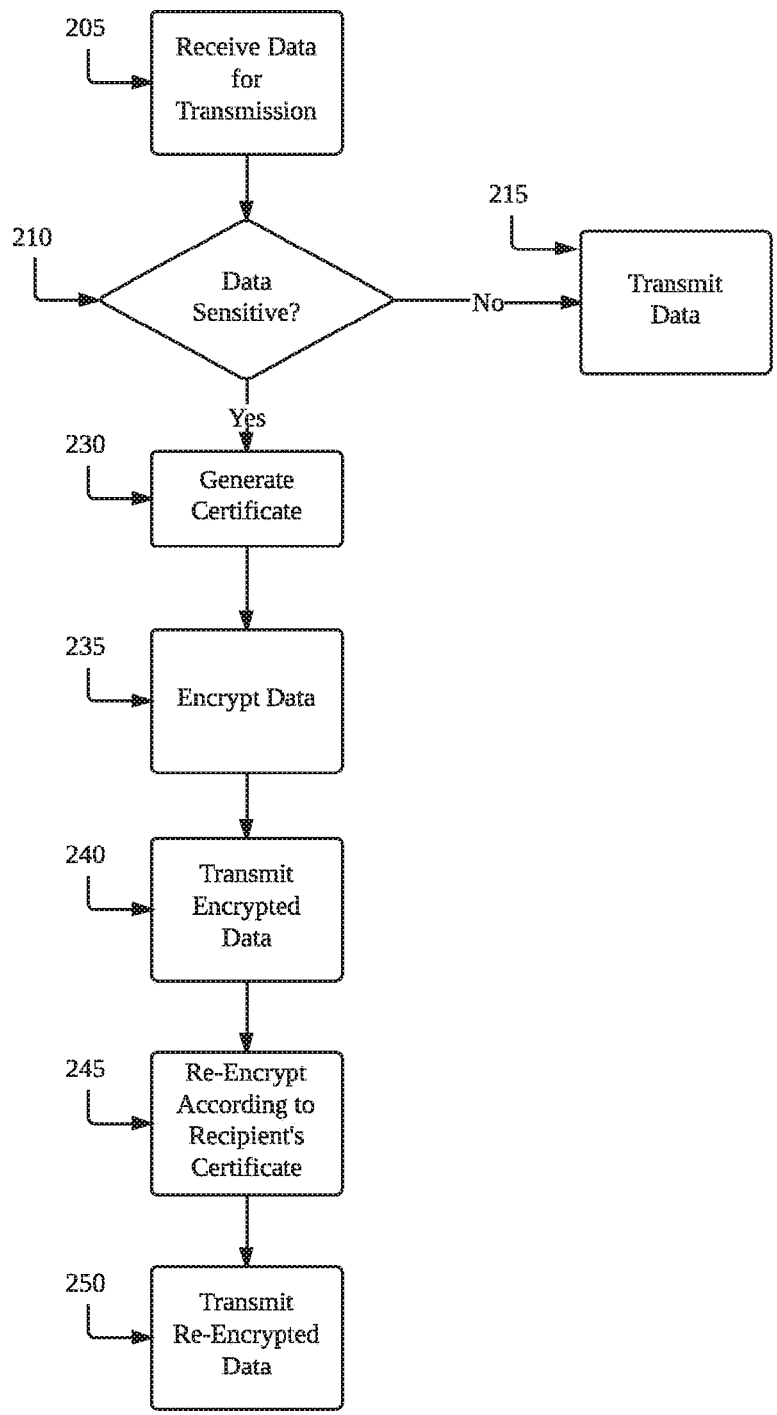
FIG. 2 is a flow chart illustrating a method for providing a cryptographic proxy service.

FIG. 2 is a flow chart setting forth the general stages involved in a method 300 consistent with embodiments of this disclosure for providing application specific certificate deployment. Method 200 may be implemented using elements of operating environment 100 as described above, a schematic block diagram 400 and a virtual desktop infrastructure (VDI) system 500, as described below. Method 200 is described below with respect to operations performed by a computing device, with the understanding that such a computing device may comprise any number devices programmed for operation of any and/or all of the steps of method 200. The described computing device may comprise, for example, client device 120, remote server 130, compliance server 140, and/or physical access point 150. Ways to implement the stages of method 200 will be described in greater detail below.

Method 200 may begin at stage 205 where a computing device may receive data for transmission. For example, a user of client device 120 may submit a wiki page entry or social media post. For another example, the user of client device 120 may send a communication, such as an e-mail or instant message to a user on another client device.

Method 200 may then advance to stage 210 where the computing device may determine whether the data comprises sensitive data. For example, the submission or message from the user of client device 120 may comprise personally identifiable information (e.g., social security number), may be submitted as an anonymous user, may contain confidential enterprise information, etc. In some embodiments, the determination may be made according to a set of content evaluation rules applied to the data. These content evaluation rules may search the data for keywords or particular destination domains, apply regular expressions for types of data (e.g., SSNs), and/or determine whether the recipient is on a list of users for whom data should be encrypted.

If no sensitive data is detected, method 200 may then advance to stage 215 where the computing device may simply transmit the data. Otherwise, method 200 may advance to stage 230 where the computing device may generate a security certificate according to a public key cryptography algorithm. Such a certificate normally comprises a public key and a private key as well as a unique issuer identifier. This certificate may be generated by remote server 130 serving as a cryptographic proxy service. A root certificate associate with remote server 130 may be installed on client device 120, allowing remote server 130 to impersonate, or spoof, the destination for the data. For example, remote server 130 may generate a certificate allegedly for the facebook.com domain if the data is destined for Facebook. Because the root certificate on client device 120 creates a trusted relationship with remote server 130, applications on the device will accept the generated certificate for use with the data as if remote server 130 were the certificate authority for the data's ultimate destination.

Public-key cryptography, also known as asymmetric cryptography, is a class of cryptographic algorithms that requires two separate keys, one of which is secret (or private) and one of which is public. Although different, the two parts of this key pair are mathematically linked. The public key may be used to encrypt data and/or to verify a digital signature; whereas the private key is used to decrypt ciphertext or to create a digital signature.

Public-key algorithms are based on mathematical problems that currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally unfeasible) for a properly generated private key to be determined from its corresponding public key.

Public-key algorithms are fundamental security ingredients in cryptosystems, applications and protocols. They underpin such Internet standards as Transport Layer Security (TLS), PGP, and GPG. Some public key algorithms provide key distribution and secrecy (e.g., Diffie-Hellman key exchange), some provide digital signatures (e.g., Digital Signature Algorithm), and some provide both (e.g., RSA).

A public key infrastructure (PKI) is a set of hardware, software, people, policies, and procedures needed to create, manage, distribute, use, store, and revoke digital certificates. In cryptography, a PKI is an arrangement that binds public keys with respective user identities by means of a certificate authority (CA). The user identity must be unique within each CA domain. The third-party validation authority (VA) can provide this information on behalf of CA. The binding is established through the registration and issuance process, which, depending on the assurance level of the binding, may be carried out by software at a CA or under human supervision. The PKI role that assures this binding is called the registration authority (RA), which ensures that the public key is bound to the individual to which it is assigned in a way that ensures non-repudiation.

After generating the certificate at stage 230, method 200 may advance to stage 235 where the computing device may encrypt the data according to the public key portion of the security certificate. For example, the public key may be transmitted from remote server 130 to client device 120, such as via an application configuration channel that may be used to communicate data across a network. In some embodiments, the computing device, such as client device 120, may need to be verified to be in compliance with compliance rules 142 before the key may be used to encrypt the data.

Method 200 may then advance to stage 240 where the computing device may transmit the encrypted data. For example, client device 120 may send the encrypted data to remote server 130. In some embodiments, client device 120 may retain the received security certificate for use in additional communications with the same data destination, such as when a large communication and/or extended communication session may require that the data be sent in multiple discrete packets or batches. The same security certificate may be used for all of these communications associated with the same data or a new certificate may be generated for each communication. For example, a data transfer comprising a two (and/or more) way communication, such as a voice, video, text, instant message, or multimedia conversation, may utilize the same security certificate for each transmission of data from one participant in the communication. In some embodiments, the security certificate may be retained for future, unrelated communications with the same data destination.

Method 200 may then advance to stage 245 where the computing device may re-encrypt the data. For example, remote server 130 may use the private key portion of the generated certificate to decrypt the data. Remote server 130 may then determine whether a secure communication channel already exists with the destination for the data. Such a channel may exist when the destination comprises a second client device associated with the same enterprise as client device 120, and so the second client device may have already provided a public key to remote server 130 for use in encrypting data for the second client device. When a secure communication channel does not already exist, remote server 130 may negotiate with the destination to establish the channel. For example, remote server 130 may acquire a public key from a certificate authority associated with the data destination in order to encrypt the data such that the data destination will be able to decrypt it. For another example, remote server 130 may establish a secure socket layer (SSL) communication channel with the data destination. In some embodiments, remote server 130 may store the means for establishing the secure communication channel for future use with the same data destination.

In some embodiments, a secure communication channel may not be able to be established with the ultimate destination for the sensitive data. In such cases, remote server 130 may notify client device 120, request permission to send the data insecurely, and/or decline to send the data insecurely. The option selected may depend upon the type of the data and/or may be configured as part of the rules for detecting the sensitive data.

Method 200 may then advance to stage 250 where the computing device may transmit the re-encrypted data. For example, remote server 130 may send the re-encrypted data to the data destination. Method 200 may then end.

Figure 3:
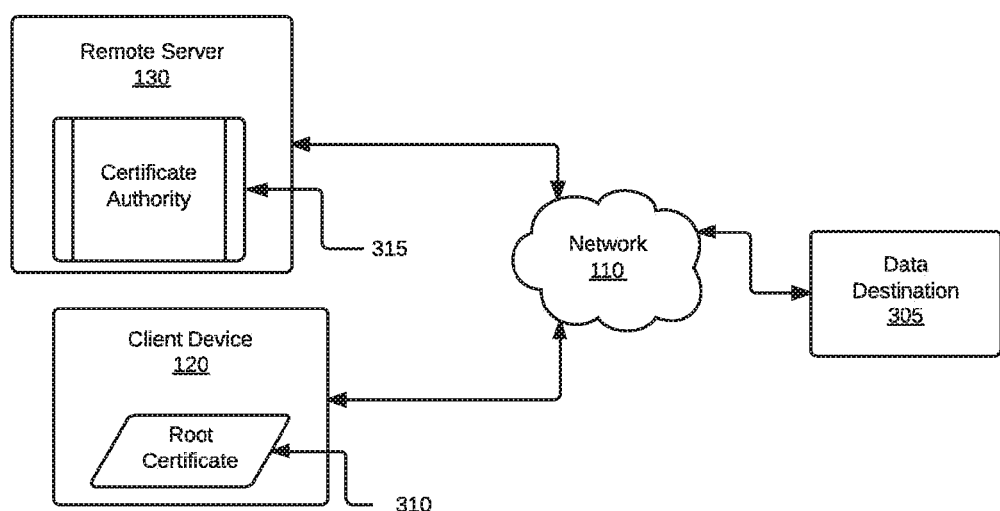
FIG. 3 is a block diagram of a communication system providing a cryptographic proxy server.

FIG. 3 is a block diagram of a communication system 300 providing a cryptographic proxy service. Communication system 300 may comprise client device 120, remote server 130, and a data destination 305. Remote server 130 may provide a root certificate 310 to client device 120 associated with a certificate authority 315 executing on remote server 130.

In cryptography, a certificate authority (CA) is an entity that issues digital certificates. The digital certificate certifies the ownership of a public key by the named subject of the certificate. This allows others (relying parties) to rely upon signatures or assertions made by the private key that corresponds to the public key that is certified. In this model of trust relationships, a CA is a trusted third party that is trusted by both the subject (owner) of the certificate and the party relying upon the certificate. CAs are characteristic of many public key infrastructure (PKI) schemes.

Figure 4:
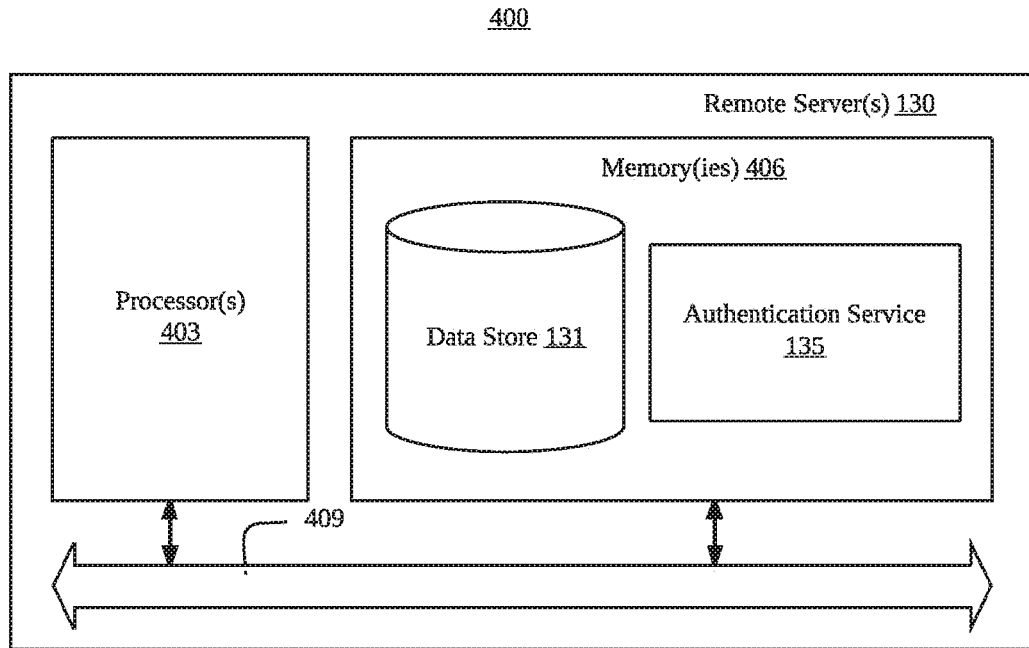
FIG. 4 is a schematic block diagram of a remote server and a client device.
Figure 4:
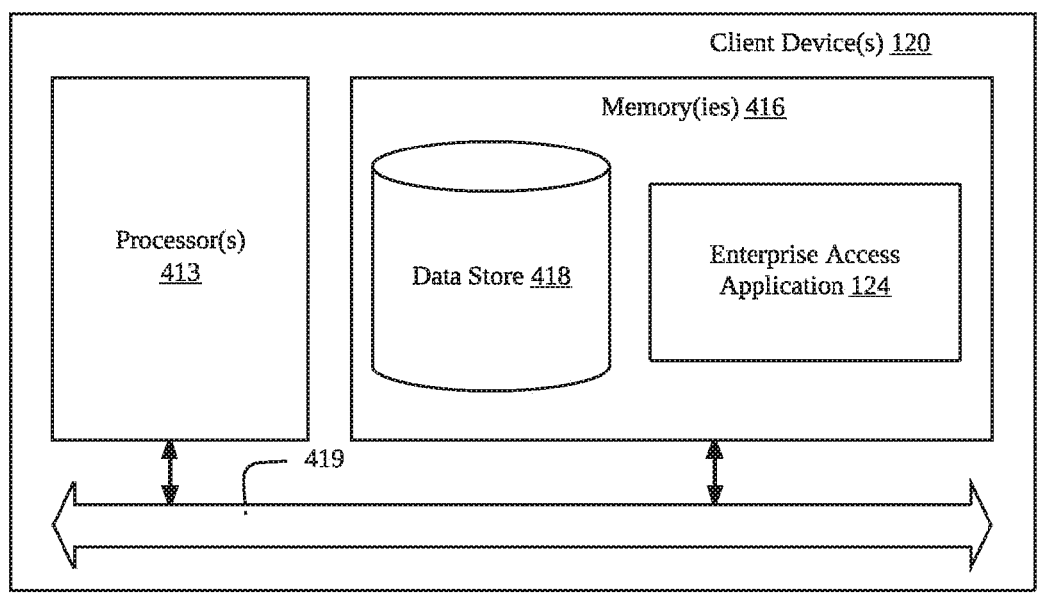

FIG. 4 illustrates schematic block diagram 400 of the remote server 130 and the client device 140 according to embodiments of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc.

Figure 5:
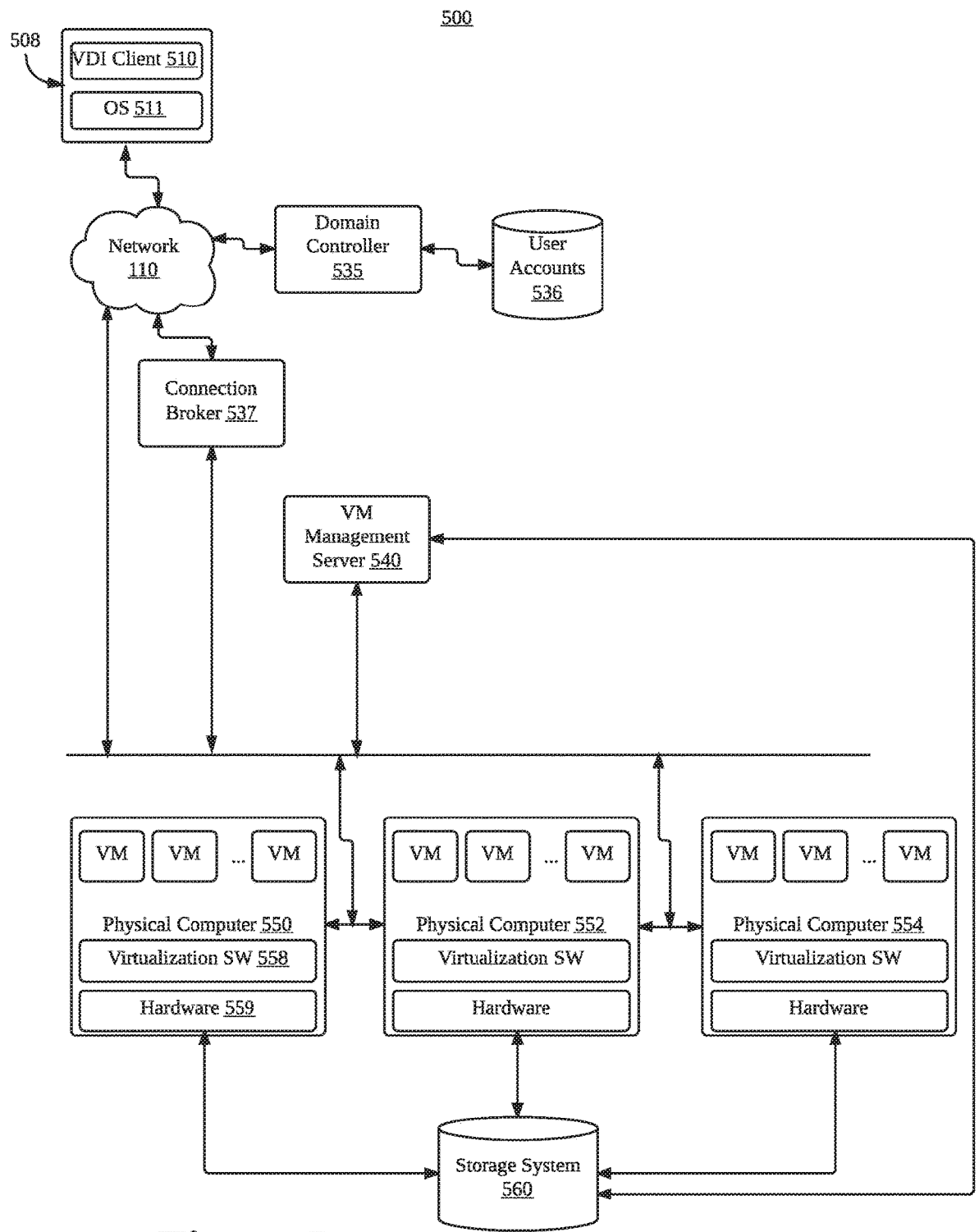
FIG. 5 illustrates components of a virtual desktop infrastructure (VDI) system in which embodiments of the present disclosure may be implemented.

FIG. 5 illustrates components of a virtual desktop infrastructure (VDI) system 500 in which embodiments of the present disclosure may be implemented. In VDI system 500, VDI client software programs such as VDI client 510, run on operating systems of local computing devices, e.g., client machine 508 on top of an operating system (OS) 511. VDI clients provides an interface for the users to access their desktops, which may be running in one of virtual machines 557 or blade server (not shown) in a data center that is remote from the users' locations. The term "desktop" may refer to the instance of an interactive operating environment provided by a computer operating system and software applications, typically in the form of a display and sound output and keyboard and mouse input. With VDI clients, users can access desktops running in a remote data center through network 110, from any location, using a general purpose computer running a commodity operating system and a VDI client software program such as VMware® View, or a special purpose thin client such as those available from Dell, HP, NEC, Sun Microsystems, Wyse, and others.

VDI system 500 may include a domain controller 535, such as Microsoft® Active Directory® that manages user accounts 536 including user log-in information, and a connection broker 537 that manages connections between VDI clients and desktops running in virtual machines 557 or other platforms. Domain controller 535 and connection broker 537 may run on separate servers or in separate virtual machines running on the same server or different servers. In the embodiments of the present disclosure illustrated herein, desktops are running in virtual machines 557 are instantiated on a plurality of physical computers 550, 552, 554, each of which includes virtualization software 558 and hardware 559. Physical computes 550, 552, 554 may be controlled by a virtual machine management server 540, and be coupled to a shared persistent storage system 560.

All of the components of VDI system 500 communicate via network 110. For simplicity, a single network is shown but it should be recognized that, in actual implementations, the components of VDI system 500 may be connected over the same network or different networks. Furthermore, a particular configuration of the virtualized desktop infrastructure is described above and illustrated in FIG. 5, but it should be recognized that one or more embodiments of the present disclosure may be practiced with other configurations of the virtualized desktop infrastructure.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for providing a cryptographic proxy service, the method comprising:
    identifying a network destination to which a computing device is requesting or attempting to transmit sensitive data, the sensitive data being identified prior to transmission based on comparing the network destination to a list of network destinations;
    obtaining a spoofed security certificate of the network destination;
    sending a first public key, which is a public key of the spoofed security certificate, to the computing device for encrypting the sensitive data;
    receiving the encrypted sensitive data;
    decrypting the sensitive data using a private key of the spoofed security certificate;
    determining whether or not an actual security certificate of the network destination has already been obtained;
    determining data to be the sensitive data by applying a plurality of content evaluation rules to the data, wherein the applied content evaluation rules include keywords, expressions for types of data, and destination domain comparison;
    responsive to determining that the actual security certificate of the network destination has already been obtained, encrypting the sensitive data according to a public key of the actual security certificate, forwarding the encrypted sensitive data to the network destination; and
    responsive to determining that the security certificate of the network destination has not already been obtained, obtaining a second public key from a certificate authority associated with the network destination, encrypting the sensitive data using the second public key, and forwarding the encrypted sensitive data to the network destination.

2. The method of claim 1, further comprising operating as a certificate authority for the spoofed security certificate.

3. The method of claim 1, further comprising installing a root certificate on the computing device based on which the computing device accepts the first public key.

4. The method of claim 1, further comprising verifying, as a condition for sending the first public key, that the computing device is in compliance with a compliance rule specifying at least one of an encryption requirement and a firmware-version requirement.

5. The method of claim 1, further comprising storing the second public key for future use in establishing a secure channel with the network destination.

6. A non-transitory, computer-readable medium containing instructions that, when executed by a hardware-based processor, performs stages for providing a cryptographic proxy service, the stages comprising:
    identifying a network destination to which a computing device is requesting or attempting to transmit sensitive data, the sensitive data being identified prior to transmission based on comparing the network destination to a list of network destinations;
    obtaining a spoofed security certificate of the network destination;

sending a first public key, which is a public key of the spoofed security certificate, to the computing device for encrypting the sensitive data;

receiving the encrypted sensitive data;

decrypting the sensitive data using a private key of the spoofed security certificate;

determining whether or not an actual security certificate of the network destination has already been obtained;

determining data to be the sensitive data by applying a plurality of content evaluation rules to the data, wherein the applied content evaluation rules include keywords, expressions for types of data, and destination domain comparison;

responsive to determining that the actual security certificate of the network destination has already been obtained, encrypting the sensitive data according to a public key of the actual security certificate, forwarding the encrypted sensitive data to the network destination; and responsive to determining that the security certificate of the network destination has not already been obtained, obtaining a second public key from a certificate authority associated with the network destination, encrypting the sensitive data using the second public key, and forwarding the encrypted sensitive data to the network destination.

7. The non-transitory, computer-readable medium of claim 6, the stages further comprising operating as a certificate authority for the spoofed security certificate.

8. The non-transitory, computer-readable medium of claim 6, the stages further comprising installing a root certificate on the computing device based on which the computing device accepts the first public key.

9. The non-transitory, computer-readable medium of claim 6, the stages further comprising verifying, as a condition for sending the first public key, that the computing device is in compliance with a compliance rule specifying at least one of an encryption requirement and a firmware-version requirement.

10. The non-transitory, computer-readable medium of claim 6, the stages further comprising storing the second public key for future use in establishing a secure channel with the network destination.

11. A cryptographic proxy system comprising:
a memory storage including a non-transitory, computer-readable medium comprising instructions; and
a server including a hardware-based processor that executes the instructions to carry out stages comprising:

identifying a network destination to which a computing device is requesting or attempting to transmit sensitive data, the sensitive data being identified prior to transmission based on comparing the network destination to a list of network destinations;

obtaining a spoofed security certificate of the network destination;

sending a first public key, which is a public key of the spoofed security certificate, to the computing device for encrypting the sensitive data;

receiving the encrypted sensitive data;

decrypting the sensitive data using a private key of the spoofed security certificate;

determining whether or not an actual security certificate of the network destination has already been obtained;

determining data to be the sensitive data by applying a plurality of content evaluation rules to the data, wherein the applied content evaluation rules include keywords, expressions for types of data, and destination domain comparison;

responsive to determining that the actual security certificate of the network destination has already been obtained, encrypting the sensitive data according to a public key of the actual security certificate, forwarding the encrypted sensitive data to the network destination; and responsive to determining that the security certificate of the network destination has not already been obtained, obtaining a second public key from a certificate authority associated with the network destination, encrypting the sensitive data using the second public key, and forwarding the encrypted sensitive data to the network destination.

12. The system of claim 11, the stages further comprising operating as a certificate authority for the spoofed security certificate.

13. The system of claim 11, the stages further comprising installing a root certificate on the computing device based on which the computing device accepts the first public key.

14. The system of claim 11, the stages further comprising verifying, as a condition for sending the first public key, that the computing device is in compliance with a compliance rule specifying at least one of an encryption requirement and a firmware-version requirement.

15. The system of claim 11, the stages further comprising storing the second public key for future use in establishing a secure channel with the network destination.

\* \* \* \* \*